Nov. 14, 1939.                R. W. SMITH                2,179,901
                             GROUND DETECTOR
                            Filed Dec. 1, 1934
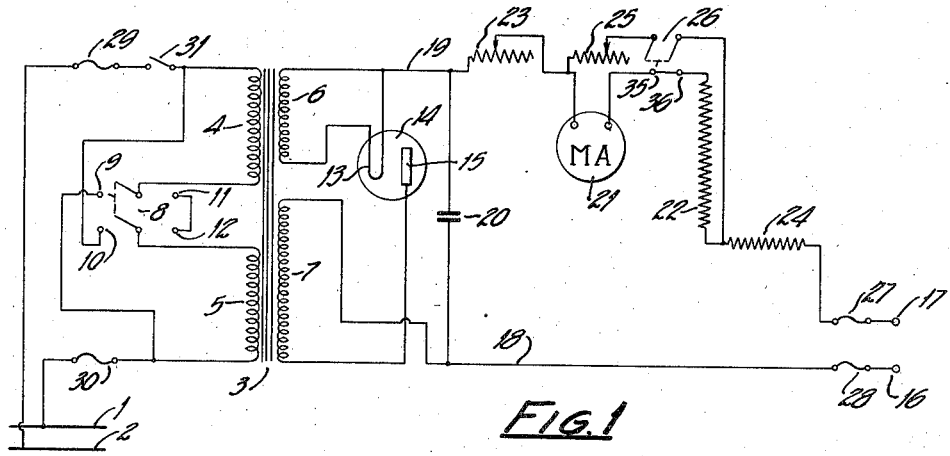
Fig.1
Fig.2
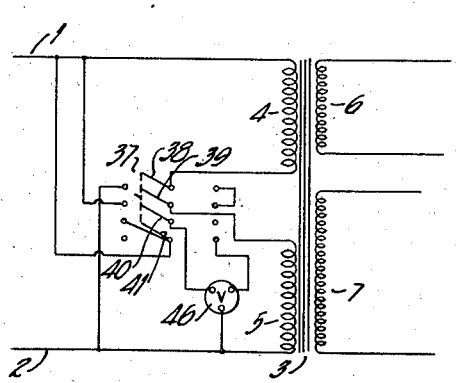
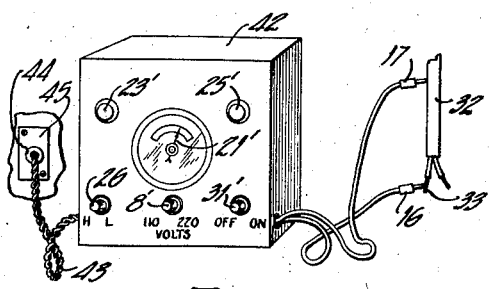
Fig.3
INVENTOR
RALPH W. SMITH
BY
ATTORNEYS Patented Nov. 14, 1939

2,179,901

UNITED STATES PATENT OFFICE 2,179,901

GROUND DETECTOR

Ralph W. Smith, Walton, N. Y.

Application December 1, 1934, Serial No. 755,571

8 Claims. (Cl. 175—183)

My invention more specifically relates to a device which is designed and adapted to measure and indicate the passage of minute electrical currents through or across the surface of an electrical insulating medium of comparatively high resistance.

High resistance mediums, which are used for insulating and dielectric purposes, often contain a latent defect which upon a superficial inspection or under ordinary test, such as those tests commonly conducted with a battery and bell or a test lamp, or even high potential unless there is a complete breakdown, are not detectable. Defects of the above character very often cause disruption of service under abnormal conditions due to a resistance break down resulting from various causes. Excessive voltage, moisture and other factors enter in as contributing or sole causes of break downs of this nature.

My invention, therefore, has for a first object the provision of means whereby the existence of latent defects in high resistance mediums, which permit or might permit minute current leakages, may readily be detected.

Another problem arises in connection with existing electrical installations. For example, upon the completion of the installation of an electrical system, tests must be conducted to insure against defects such as short circuits, open circuits and the like, which may exist either in the wiring system or in the electrical equipment associated therewith. It is evident that no distinction is to be made between the method of testing installations which are in operation and those which have been recently completed and before electrification thereof.

Test methods involving the use of a bell, lamp, or the like are adequate for all practical purposes in determining pronounced defects of the foregoing character. However, where tests are to be conducted for determining the flow of small, or very minute electrical currents which are indicative of defective equipment, the above testing equipment is entirely inadequate. Furthermore, in the case of installation testing the equipment is usually far removed from laboratories and delicate testing instruments and hence a dismantling process must be resorted to so that the parts thereof, which are to be subjected to tests, may be removed and transported for that purpose.

My invention, therefore, has for a further object the provision of a device, primarily adapted for indicating the conductance of very high resistances, which is portable, rugged in construction, simple in operation, and which may be connected to any commercial distribution system of electrical energy.

In many instances, the element or high resistance to be tested is associated with an electrical device or assembly connected in an electrical network such, for example, as a grounded system in which stray currents may be set up which would not only affect the results of a testing device using the same or similar source of power but also burn out the testing apparatus unless the test circuit is so designed that no current of substantial magnitude from the circuit or apparatus being tested can "feed back" therethrough. My invention contemplates the provision of means for changing the character of the power which is used for testing purposes from that of the source of supply and therewith providing indicating means which is operable only in response to power of the desired character. Inasmuch as most distribution systems are supplied by alternating current, my invention, in a specific embodiment thereof, includes means for rectifying alternating current whereby direct current is provided for testing purposes together with a direct current meter, and whereby the rectifying means will function as a check valve to prevent heavy currents from the system, circuit or apparatus being tested from "feeding back" through the testing device.

A still further object of my invention resides in the inclusion in a testing device of the character above described of means adapting the same for use with sources of supply of different potentials.

With these and other objects in view, my invention includes the novel elements and the combinations and arrangements thereof, described below, and illustrated in the accompanying drawing in which—

Fig. 1 is a wiring diagram showing my preferred form of the device;

Fig. 2 is a fragmentary wiring diagram showing my device equipped with a meter for indicating or checking the voltage on the supply lines; and Fig. 3 is a perspective view of the device.

Referring to the drawing, 1 and 2 indicate the power supply lines which in most cases will carry either 110 or 220 volts. 3 indicates a transformer having two similar primary windings 4 and 5 and two secondary windings 6 and 7. The primary windings 4 and 5 may be connected either in series or in parallel across the mains 1 and 2 by means of the switch 8. This switch is a double pole double throw switch, and when it is thrown into contact with the terminals 9 and 10 it will be apparent that the primary windings 4 and 5 are connected in parallel across the mains 1 and 2. On the other hand if the switch is thrown into contact with the terminals 11 and 12 the windings 4 and 5 will be connected in series across the mains 1 and 2. The purpose of the switch 8 is to permit the device to be used with a line voltage of either 110 volts or 220 volts and still have the same voltage in the secondary or testing circuit.

Referring first to Fig. 1, the secondary winding 6 is designed to supply the energizing current at preferably six volts for the hot cathode or filament 13 of a thermionic rectifier 14 and is illustrated as connected in series therewith. The anode or plate 15 of the tube 14 is connected to one side of the secondary winding 7 and the other terminal of winding 7 is directly connected through conductor 18 to a test lead 16. The other test lead 17 is electrically connected to the filament 13 through conductor 19. Connected across the conductors 18 and 19, which extend to the test leads 16 and 17, respectively, is a condenser 20 designed to smooth out the pulsating direct current into which the alternating current is rectified by the tube 14 which, as illustrated, is designed for half wave rectification.

Obviously, in this embodiment of my invention, I may employ any suitable current rectifying device, and furthermore, such device may be of the half or full wave rectifying type. However, by way of illustration, I have shown a thermionic rectifier which from experimentation has proven suitable for the purposes intended.

Electrically interposed between the test lead 17 and filament 13 are various resistances, and a milliammeter indicated at 21. The fixed resistance 22 is comparatively high, say of the order of 550,000 ohms, while the variable resistance 23 is relatively low, say of the order of 3,000 ohms. The resistance 24 is of intermediate order and may, for example, be 25,000 ohms. Shunted across the milliammeter 21 is a variable resistance 25 of three or four ohms. A double pole single throw switch 26 is provided whereby the very high resistance 22 may be shunted out of the electrical circuit connecting the filament 13 and test lead 17.

Fuses 27 and 28 are provided near the test leads, and fuses 29 and 30 are provided between the source of power and the primary windings of the transformer. A single pole single throw switch 31 is also provided so that the device may be put into or out of operation.

The magnitudes of the fixed resistances 22 and 24 depend somewhat upon the rating of the milliammeter 21 and are so selected that when the test leads 16 and 17 are connected together, or short circuited, the needle of the milliammeter will indicate a substantially full scale reading. Due to variations in main line voltage it is desirable to provide the variable resistances 23 and 25. When switch 26 is open, resistance 23 may be so adjusted that when the test leads 16 and 17 are connected together the needle of the milliammeter will indicate a maximum current flow of say one milliampere. When the high-order resistance 22 is shunted out by closing switch 26, the total resistance of the testing circuit is so very substantially reduced that the variable resistance 25 in the shunt circuit is used together with the series resistance 23 to adjust the needle reading of the milliammeter, as above described, for maximum current flow when leads 16 and 17 are connected together.

From the foregoing it will be apparent, for example, that if switch 26 is open and the maximum reading of the milliammeter is adjusted to 1 milliampere with a dead short circuit across the leads 16 and 17, this small current is flowing through a resistance in the neighborhood of 575,000 ohms. The voltage in the secondary circuit necessary to create this current flow in the hook-up illustrated in Fig. 1 is readily computed as $E=RI$, in which E is the voltage, R the resistance and I the current. Thus, $$E = 575000 \times 0.001 = 575 \text{ volts.}$$

Since my device is essentially a megohm meter used to measure the electrical conductance of insulating media having normal resistances of the order of millions of ohms, the voltage in the secondary circuit, the magnitude order of the resistances 22 and 24, and the current measuring capacity of the milliammeter should be so correlated and adjusted as preferably to give, as pointed out above, a substantially full scale reading of the milliammeter when the test leads are connected together. This is important in order to obtain an appreciable movement, or at least a movement of observable magnitude, of the ammeter needle which a resistance of several megohms is tested.

For example, with a voltage of 575 volts, and a total of 575,000 ohms in resistances 22 and 24 the current flow would be one milliampere. If a milliammeter having a needle which swings through an arc of ninety degrees between 0 and 1 milliampere is used, it should be easy to note a needle movement amounting to as small as 0.01 of the total, or a current magnitude of .00001 ampere. With this current the total resistance in the secondary circuit would be $$R = \frac{E}{I}$$

or $575 \div 0.00001 = 57,500,000$ ohms or 57.5 megohms, which would be about the usable capacity of the instrument with this particular combination of elements.

Referring to Fig. 3, if it is desired to test the conductance between a metallic cable sheating 32 and one of the wires 33 within the cable sheathing, the leads 16 and 17 are first connected together to form a dead short circuit at this point and the resistance 23 (assuming that switch 26 is open) is manipulated so that under these conditions the milliammeter registers one milliampere. The lead 17 is then placed in contact with the metallic sheathing 32 and the other test lead 16 is placed in contact with the wire 33. If there is no leakage whatever between the sheathing 32 and the wire 33, the milliammeter will register zero. On the other hand, if there is a dead short circuit, the milliammeter will register one milliampere; and if there is a leakage having a resistance of about 60.000 ohms the milliammeter will register approximately .5 of a milliampere.

By throwing the switch 26 into contact with the terminals 35 and 36, the resistance 22 of extremely high order is shunted out of the testing circuit leaving only the resistance 24 of intermediate order and the relatively low resistances 23 and 25. With the switch 26 in this position the device is very much less sensitive than it is with the extremely high order resistance in the circuit.

If desired, my device may be provided with a voltmeter for indicating the voltage across the mains 1 and 2. In this case I substitute for the switch 8 a four pole double throw switch 37. The poles 38 and 39 of which function exactly as the two poles of the switch 8 shown in Fig. 1, while the poles 40 and 41 serve to connect the voltmeter 46 across the mains 1 and 2 irrespective of whether the switch 37 is thrown to the right or left as viewed in Fig. 2.

In Fig. 3 I have shown the practical embodiment of my device (without the voltmeter) which comprises a casing 42 in which the mechanism is assembled. A two wire cable represented at 43 is provided with a plug 44 which may be inserted in any wall socket 45 to connect the device to the supply mains 1 and 2. The switch 26 when snapped to the left is in open position, as shown in Fig. 1, and resistance 22 of high order is in the testing circuit, whereas when snapped to the right, switch 26 is in closed position so that the high resistance 22 is shunted. The variable resistance 23 is operated by the dial 23' and the variable resistance 25 is operated by the dial 25' to adjust the reading of the milliammeter needle shown at 21'. The switch 31 is operated by the knob 31', and switch 8 is operated by the knob 8'. The test leads are shown at 16 and 17.

My device is extremely sensitive especially to moisture and faulty insulation, and condensers, for example, which show no flow of conduction current whatever when subjected to the usual tests, frequently are indicated as defective by my apparatus. Furthermore, although the high degree of sensitiveness of my device adapts it for use in testing mediums of comparatively high resistance, it may also be used to determine ordinary circuit conditions such as short and open circuits.

I have, in the foregoing, described a milliammeter as the means which I employ for indicating the conductance of high resistances. It is to be understood, however, that I may use various kinds of indicating means including meters of various ratings, provided, and it is merely a matter of mathematical computation, that the test circuit is designed and arranged according to the particular indicating means to be employed.

Likewise, means, well known in the art, may be provided whereby the testing voltage may be varied to meet certain requirements where the nature of the object to be tested so demands. For example, in certain cases a medium of comparatively high resistance should be tested under an impressed potential of a predetermined magnitude above its normal working voltage. However, my invention, in its preferred embodiments, is designed to provide a predetermined, adequate potential for all testing purposes.

The embodiment of my device illustrated in Fig. 1 is markedly superior to megohm meters of the type now available and which use a direct current meter operating at a potential of around 500 volts, either from a hand cranked or motor driven generator. Megohm meters of the present type cannot be connected to live circuits, whereas my device can be used in testing live circuits and apparatus in operation without danger either to the operator or the instrument.

With my device it is possible to test the entire electric equipment of any plant or factory without shutting down any part of it. Moreover, many defects, such as leaks or grounds due to vibration, and which are apparent only when the equipment is in operation cannot be detected by the present megohm meters, whereas with my device they are easily discovered.

What I claim is:

1. The method of detecting insulation defects or grounds having resistances up to a predetermined number of megohms in an alternating current electrical system or apparatus while in operation which comprises, transforming alternating current from a suitable source and rectifying the same to provide a source of direct current, forming an electric circuit in which said defects or grounds, if existent, are in series with said source of direct current and with a resistance of an order constituting a substantial fractional portion of said predetermined number of megohms, and noting the flow of current, if any, in said circuit; the voltage of said transformed-rectified curent being sufficient to create a current flow of readily measurable magnitude through said resistance alone.

2. The method of detecting insulation defects or grounds having resistances up to a predetermined number of megohms in an alternating current electrical system or apparatus while in operation which comprises, transforming alternating current from a suitable source to a somewhat higher voltage than that at which said system or apparatus is operating, rectifying the same to provide a source of direct current, forming an electric circuit in which said defects or grounds, if existent, are in series with said source of direct current and with a resistance of an order constituting a substantial fractional portion of said predetermined number of megohms, and noting the flow of current, if any, in said circuit; the voltage of said transformed-rectified current being sufficient to create a current flow of readily measurable magnitude through said resistance alone.

3. A device adapted for testing alternating current electric systems and apparatus while "live" or in operation for leaks or grounds offering a resistance to the flow of electrical currents up to a predetermined number of megohms and which comprises means forming a series circuit including a resistance of a magnitude constituting a substantial fractional portion of said predetermined number of megohms, a direct current milliammeter, means for connecting the medium to be tested in series in said circuit, and a thermionic rectifier for supplying direct current to said circuit and also for preventing the "feed back" through said circuit of substantial current from the system or apparatus being tested; a transformer and means for operatively connecting said rectifier through said transformer to a supply of alternating current; the voltage of the current from said rectifier, the magnitude of said resistance, and the measuring capacity of said milliammeter being so correlated as to provide a reading of substantial magnitude of the milliammeter when current is flowing in said circuit through said resistance alone; whereby a small but observable reading of said milliammeter will occur when current is flowing in said circuit through both said resistance and a leak or ground offering a resistance of the order of said predetermined number of megohms.

4. A portable device adapted for use in detecting leaks or grounds in alternating current electric systems and apparatus while "live" or in operation and which said defects permit the flow of extremely minute currents along paths offering an electrical resistance up to a predetermined number of megohms, said device comprising a casing, a transformer therein, means for connecting the primary of said transformer to power supply lines carrying alternating current, a thermionic rectifier in said casing connected with the secondary of said transformer for changing the current from said secondary to a pulsating direct current and for preventing the "feed back" through the testing device of any substantial current from the system or apparatus being tested, means for connecting the medium to be tested in a series circuit with the output of said rectifier, a direct current milliammeter in said circuit and a series resistance in said circuit of an order constituting a substantial fractional part of said predetermined number of megohms; the voltage in said circuit, the magnitude order of said series resistance, and the current measuring capacity of said milliammeter being so fixed and correlated that current flowing in said circuit through said series resistance alone will produce a substantial reading of said milliammeter; whereby a small but observable reading of said milliammeter will occur when current is flowing in said circuit through both said resistance and a leak or ground in said medium offering a resistance up to the order of said predtermined number of megohms.

5. A device adapted for testing alternating current electric systems and apparatus while "live" or in operation for leaks or grounds offering a resistance to the flow of electric currents up to a predetermined number of megohms and which comprises means forming a series circuit including a plurality of resistances in series of a total magnitude constituting a substantial fractional portion of said predtermined number of megohms, a switch for shunting a substantial portion of said total resistance, a direct current milliammeter, means for connecting the medium to be tested in series in said circuit and a thermionic rectifier for supplying direct current to said circuit and also for preventing the "feed back" through said circuit of substantial current from the system or apparatus being tested; a transformer, and means for operatively connecting said rectifier through said transformer to a supply of alternating current; the voltage of the current from said rectifier, the total magnitude of said resistances, and the measuring capacity of said milliammeter being so correlated as to provide a reading of substantial magnitude of the milliammeter when current is flowing in said circuit through said resistances alone; whereby a small but observable reading of said milliammeter will occur when current is flowing in said circuit through both said resistances and a leak or ground offering a resistance of the order of said predetermined number of megohms.

6. A portable device adapted for use in detecting leaks or grounds in alternating current electric systems and apparatus while "live" or in operation and which said defects permit the flow of extremely minute currents along paths offering an electrical resistance up to a predetermined number of megohms, said device comprising a casing, a transformer therein, means for connecting the primary of said transformer to power supply lines carrying alternating current, a thermionic rectifier in said casing connected with the secondary of said transformer for changing the current from said secondary to a pulsating direct current and for preventing the "feed back" through the testing device of any substantial current from the system or apparatus being tested, means for connecting the medium to be tested in a series circuit with the output of said rectifier, a direct current milliammeter in said circuit, a plurality of resistances in series in said circuit of a total magnitude constituting a substantial fractional part of said predetermined number of megohms and a switch for shunting a substantial part of said total resistance; the voltage in said circuit, and the total magnitude order of said series resistances, and the current measuring capacity of said milliammeter being so fixed and correlated that current flowing in said circuit through said series resistances alone will produce a substantial reading of said milliammeter; whereby a small but observable reading of said milliammeter will occur when current is flowing in said circuit through both said resistances and a leak or ground in said medium offering a resistance up to the order of said predetermined number of megohms.

7. The method of detecting insulation defects or grounds having resistances up to a predetermined number of megohms in an alternating current electrical system or apparatus while in operation which comprises, rectifying alternating current from a suitable source to provide a source of direct current, forming an electric circuit in which said defects or grounds, if existent, are in series with said source of direct current and with a resistance of an order constituting a substantial fractional portion of said predetermined number of megohms, and noting the flow of current, if any, in said circuit; the voltage of said rectified current being sufficient to create a current flow of readily measurable magnitude through said resistance alone.

8. A device adapted for testing alternating current electric systems and apparatus while "live" or in operation for leaks or grounds offering a resistance to the flow of electrical currents up to a predetermined number of megohms and which comprises means forming a series circuit including a resistance of a magnitude constituting a substantial fractional portion of said predetermined number of megohms, a direct current measuring device, means for connecting the medium to be tested in series in said circuit, and a rectifier for supplying direct current to said circuit and also for preventing the "feed back" through said circuit of substantial current from the system or apparatus being tested; and means for operatively connecting said rectifier to a supply of alternating current; the voltage of the current from said rectifier, the magnitude of said resistance, and the measuring capacity of said direct current measuring device being so correlated as to provide a reading of substantial magnitude of the measuring device when current is flowing in said circuit through said resistance alone; whereby a small but observable reading of said measuring device will occur when current is flowing in said circuit through both said resistance and a leak or ground offering a resistance of the order of said predetermined number of megohms.

RALPH W. SMITH.

CERTIFICATE OF CORRECTION.

Patent No. 2,179,901.                                    November 14, 1939.

RALPH W. SMITH.

It is hereby certified that error appears in the printed specification of the above numbered patent requiring correction as follows: Page 2, second column, line 29, for the word "which" read when; line 49, for "sheating" read sheathing; line 64, for "60.000 ohms" read 600,000 ohms; page 3, second column, line 19, claim 1, for "curent" read current; page 4, first column, lines 27 and 37, claims 4 and 5 respectively, for "predtermined" read predetermined; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.